United States Patent
He et al.

(10) Patent No.: US 10,270,103 B2
(45) Date of Patent: *Apr. 23, 2019

(54) CATHODE ELECTRODE MATERIAL AND LITHIUM SULFUR BATTERY USING THE SAME

(71) Applicant: Tsinghua University, Beijing (CN)

(72) Inventors: Xiang-Ming He, Beijing (CN); Guan-Nan Qian, Suzhou (CN); Li Wang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/871,079

(22) Filed: Jan. 15, 2018

(65) Prior Publication Data

US 2018/0138509 A1    May 17, 2018

Related U.S. Application Data

(63) Continuation of application No. PCT/CN2016/090020, filed on Jul. 14, 2016.

(30) Foreign Application Priority Data

Jul. 17, 2015  (CN) .......................... 2015 1 0422483

(51) Int. Cl.
*H01M 4/62* (2006.01)
*H01M 4/04* (2006.01)
*H01M 10/0525* (2010.01)
*H01M 10/052* (2010.01)
*H01M 10/0565* (2010.01)

(52) U.S. Cl.
CPC ......... *H01M 4/623* (2013.01); *H01M 4/0471* (2013.01); *H01M 4/62* (2013.01); *H01M 4/622* (2013.01); *H01M 10/052* (2013.01); *H01M 10/0525* (2013.01); *H01M 10/0565* (2013.01)

(58) Field of Classification Search
CPC ...... H01M 4/622; H01M 4/485; H01M 4/587; H01M 4/133; H01M 10/0525; H01M 4/131

See application file for complete search history.

(56) References Cited

U.S. PATENT DOCUMENTS

2012/0168688 A1* 7/2012 Nakayama ............. H01G 11/30
                                                                    252/511
2013/0101897 A1    4/2013 Fukui et al.
(Continued)

FOREIGN PATENT DOCUMENTS

| CN | 103383996 | 11/2013 |
| CN | 102201595 | 7/2015 |
| CN | 105609780 | 5/2016 |

OTHER PUBLICATIONS

International Search Report of PCT/CN2016/090020.

*Primary Examiner* — Stewart A Fraser

(57) ABSTRACT

A cathode electrode material and a lithium sulfur battery are disclosed. The cathode electrode material includes a sulfur containing cathode active material, a conducting agent, and a cathode binder. The cathode binder includes a polymer obtained by polymerizing a dianhydride monomer with a diamine monomer. The lithium sulfur battery includes an anode electrode, an electrolyte, and a cathode electrode.

19 Claims, 1 Drawing Sheet

(56) References Cited

U.S. PATENT DOCUMENTS

| | | | |
|---|---|---|---|
| 2014/0272597 A1* | 9/2014 | Mikhaylik | H01M 4/0402 |
| | | | 429/233 |
| 2014/0377649 A1* | 12/2014 | Fukui | C08G 73/1046 |
| | | | 429/217 |
| 2016/0111696 A1 | 4/2016 | Shang et al. | |
| 2017/0226291 A1* | 8/2017 | Qian | C08G 73/1071 |
| 2018/0138510 A1* | 5/2018 | He | H01M 4/62 |

* cited by examiner

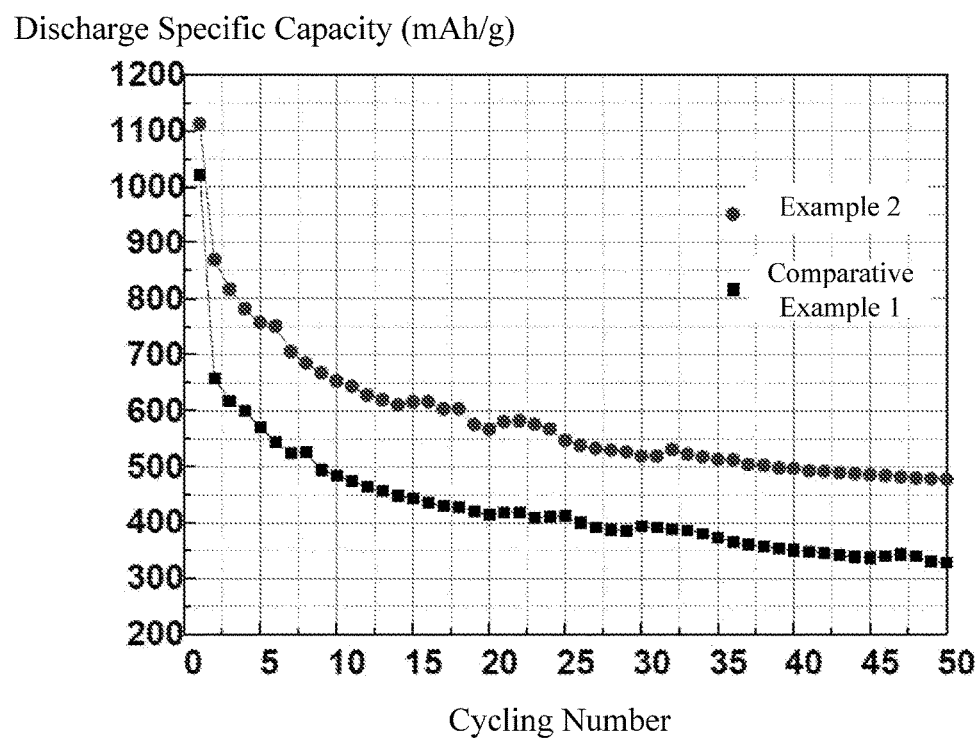

CATHODE ELECTRODE MATERIAL AND LITHIUM SULFUR BATTERY USING THE SAME

CROSS-REFERENCE TO RELATED APPLICATIONS

This application claims all benefits accruing under 35 U.S.C. § 119 from China Patent Application No. 201510422483.9, filed on Jul. 17, 2015 in the State Intellectual Property Office of China, the content of which is hereby incorporated by reference. This application is a continuation under 35 U.S.C. § 120 of international patent application PCT/CN2016/090020 filed on Jul. 14, 2015, the content of which is also hereby incorporated by reference.

FIELD

The present disclosure relates to cathode electrode materials and sulfur batteries using the same.

BACKGROUND

For a long time, people have been committed to the research and development of new energy storage systems. Among them, lithium sulfur secondary batteries are considered the most attractive battery system. Sulfur has the highest theoretical specific energy (2800 Wh/kg) and theoretical specific capacity (1675 Ah/kg) compared to other battery systems.

However, lithium sulfur batteries generate polysulfides during charge-discharge cycles. The polysulfides dissolve in organic electrolytes, resulting in irreversible loss of active material and decay of capacity. Moreover, with the insertion and extraction of lithium ions during the charge-discharge cycle, the sulfur cathode electrode has a volumetric expansion and contraction. As cycling number increases, the cathode electrode structure collapses and the cathode electrode material spalls, causing a rapid decay of the capacity.

Experiments have shown that a commonly used oily binder such as polyvinylidene fluoride (PVDF) has a deteriorated cycling performance for lithium sulfur batteries. An aqueous binder such as polyacrylic acid or polyacrylate is used in the lithium-sulfur battery system. However, during the manufacturing of the electrode, the cathode active material, such as sulfur, is mixed with the conducting agent and the binder in a solvent to form an electrode slurry, which is coated on the surface of the current collector and then dried to remove the solvent. For oily binders, volatile organic solvents can be used to make electrode slurries that are easier to dry. For aqueous binder, a relatively long time is needed to thoroughly dry water in the slurry at a relatively low temperature, during which the cathode active material may be oxidized.

SUMMARY

A cathode electrode material comprising a sulfur containing cathode active material, a conducting agent, and a cathode binder, wherein the cathode binder comprises a polymer obtained by polymerizing a dianhydride monomer with a diamine monomer. The dianhydride monomer comprises a monomer selected from the group consisting of monomers represented by formulas I, II, III, and combinations thereof. The diamine monomer comprises a first monomer represented by formula IV,

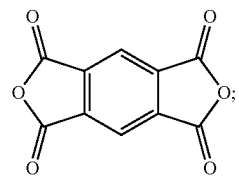

I

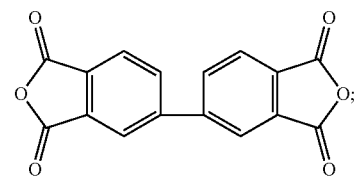

II

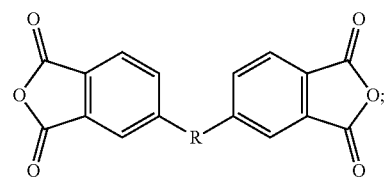

III

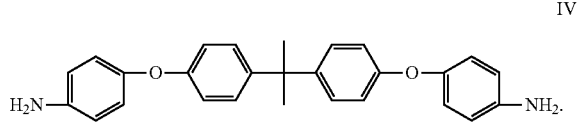

IV

A lithium sulfur battery comprising an anode electrode, an electrolyte; and a cathode electrode, the cathode electrode comprising the cathode electrode material.

BRIEF DESCRIPTION OF THE DRAWINGS

Implementations are described by way of example only with reference to the attached FIGURE.

The FIGURE is a graph showing cycling performances of Example 2 and Comparative Example 1 of lithium sulfur batteries.

DETAILED DESCRIPTION

A detailed description with the above drawings is made to further illustrate the present cathode electrode materials and sulfur batteries using the same.

In one embodiment, a cathode binder of a sulfur containing cathode electrode material of a lithium sulfur battery is provided. The cathode binder is a polymer obtained by polymerizing a dianhydride monomer with a diamine monomer.

The dianhydride monomer can be represented by the formulas I, II, or III below.

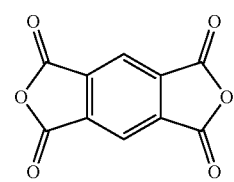

I

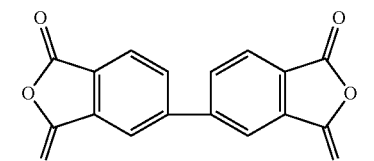

II

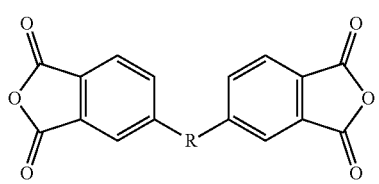

III

In the formula III, R is a bivalent organic substituent, which can be bisphenol A unit, —O—, —S—, or —CH$_2$—. The dianhydride monomer can comprise, but is not limited to, one or more of 4,4'-(4,4'-isopropylidenediphenoxy)bis(phthalic anhydride), 2,3,3',4'-diphenyl ether tetracarboxylic acid dianhydride, 1,2,4,5-benzenetetracarboxylic anhydride, and 3,3',4,4'-biphenyltetracarboxylic dianhydride.

The diamine monomer can at least comprise a monomer represented by formula IV.

IV $H_2N$—⌬—O—⌬—⌬—O—⌬—$NH_2$

In one embodiment, the diamine monomer can further comprise a monomer represented by formula V.

V $H_2N$—⌬—$R_4$—⌬—$NH_2$

In the formula V, $R_4$ is a bivalent organic substituent, which can be —(CH$_2$)$_n$—, —O—, —S—, —CH$_2$—O—CH$_2$—, —CH(NH)—(CH$_2$)$_n$—,

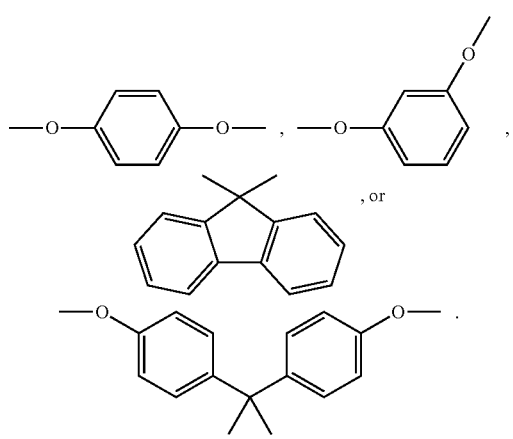

A molar ratio of the monomer of formula IV to the monomer of formula V can be 1:2 to 10:1, and in some embodiments can be 1:1 to 3:1.

A molar ratio of all the dianhydride monomer to all the diamine monomer can be 1:10 to 10:1, and in some embodiments can be 1:2 to 4:1.

A molecular weight of the cathode binder can range from about 1000 to about 50000.

One embodiment of a method for making the cathode binder comprises a step of polymerizing the dianhydride monomer with the diamine monomer, which specifically can comprise:

mixing the dianhydride monomer and the diamine monomer in an organic solvent to form a mixture, and heating and stirring the mixture to fully carry the reaction thereby obtaining the cathode binder.

The diamine monomer can be dissolved in an organic solvent to form a diamine solution. A mass ratio of the diamine monomer to the organic solvent in the diamine solution can be 1:100 to 1:1, and can be 1:10 to 1:2 in some embodiments.

The dianhydride monomer can be dissolved in an organic solvent to form a dianhydride solution. A mass ratio of the dianhydride monomer to the organic solvent in the dianhydride solution, can be 1:100 to 1:1, and can be 1:10 to 1:2 in some embodiments.

The organic solvent can dissolve the diamine monomer and the dianhydride monomer, such as N,N-dimethylformamide, N,N-dimethylacetamide, propylene carbonate, and N-methyl-2-pyrrolidone (NMP).

A pump can be used to deliver the dianhydride solution into the diamine solution at a certain speed or deliver the diamine solution into the dianhydride solution at a certain speed. After the delivery, the stirring can continue for a period of time to form a complete reaction. The stirring can last for about 2 hours to about 72 hours, and can last for about 12 hours to about 24 hours in some embodiments. The temperature of the polymerizing can be at about 160° C. to about 200° C.

During the polymerizing, a catalyst can be added. The catalyst can be at least one of benzoic acid, benzenesulfonic acid, phenylacetic acid, pyridine, quinoline, pyrrole, and imidazole. A mass percentage of the catalyst to a sum of the dianhydride monomer and the diamine monomer can be about 0.5% to about 5%.

First, the dianhydride monomer and the diamine monomer can be completely dissolved in the organic solvent, and then heated to a temperature of about 30° C. to about 60° C. at which the mixture is stirred for about 1 hour to about 10 hours, and 2 hours to 4 hours in some embodiments. The catalyst is then added to the mixture followed by heating the mixture to a temperature of about 160° C. to about 200° C. at which the mixture is stirred for about 6 hours to about 48 hours, and 12 hours to 24 hours in some embodiments, to obtain the polymer.

After the reaction, the cathode binder can be purified by washing the obtained polymer with a cleaning solvent, and dried. The catalyst and the organic solvent are soluble to the cleaning solvent, and the cathode binder is insoluble to the cleaning solvent. The cleaning solvent can be water, methanol, ethanol, a mixture of methanol and water, or a mixture of ethanol and water (a concentration of the methanol or the ethanol can be 5 wt % to 99 wt %).

One embodiment of a cathode electrode material comprises a sulfur containing cathode active material, a conducting agent, and the above-described cathode binder, which are uniformly mixed with each other. A mass percentage of the cathode binder in the cathode electrode material can be in a range from about 0.01% to about 50%, such as from about 1% to about 20%.

The sulfur containing cathode active material can be at least one of elemental sulfur and sulfur based polymer. The sulfur based polymer is a product formed from a pyrolysis reaction, dehydrogenation and carbonation reaction, dehydration reaction, dehydrochlorination reaction, or deamination reaction of a mixture of conducting polymer and elemental sulfur. The sulfur based polymer can be at least one of sulfurized poly(pyridinopyridine), sulfurized polystyrene, sulfurized polyoxyethylene, sulfurized polyvinyl alcohol, sulfurized poly(vinylidene chloride), sulfurized poly(vinylidene difluoride), sulfurized polyvinylchloride, sulfurized polyvinyl fluoride, sulfurized poly(1,2-dichloroethylene), sulfurized poly(1,2-difluoroethylene), sulfurized polymethyl methacrylate, and sulfurized phenolic resin.

The conducting agent can be carbonaceous materials, such as at least one of carbon black, conducting polymers, acetylene black, carbon fibers, carbon nanotubes, and graphite.

Since the cathode binder is oily and is soluble in an oily solvent, the cathode binder can be used in combination with an oily organic solvent commonly used in the preparation of electrode slurry of the lithium ion battery, such as N-methylpyrrolidone. The oily organic solvent can be rapidly and effectively removed during the drying process of the electrode slurry to avoid an adverse effect of the drying process on the electrode and the battery performance.

One embodiment of a lithium sulfur battery comprises a cathode electrode, an anode electrode, and an electrolyte located between the cathode electrode and the anode electrode. The cathode electrode can comprise the above-described cathode electrode material. The cathode electrode can further comprise a cathode current collector. The cathode electrode material can be located on a surface of the cathode current collector. The anode can comprise an anode electrode material, and can further comprise an anode current collector. The anode electrode material can be located on a surface of the anode current collector. The anode electrode material can be lithium metal. The electrolyte can be a solid electrolyte or an electrolyte liquid. In one embodiment, the electrolyte is the electrolyte liquid, the lithium sulfur battery can further comprise a separator, and the anode electrode material and the cathode electrode material are opposite to each other and spaced by the separator.

The separator can be polyolefin microporous membrane, modified polypropylene fabric, polyethylene fabric, glass fiber fabric, superfine glass fiber paper, vinylon fabric, or composite membrane of nylon fabric, and wettable polyolefin microporous membrane composited by welding or bonding.

The electrolyte liquid comprises a lithium salt and a non-aqueous solvent. The non-aqueous solvent can comprise at least one of cyclic carbonates, chain carbonates, cyclic ethers, chain ethers, nitriles, amides and combinations thereof, such as ethylene carbonate (EC), diethyl carbonate (DEC), propylene carbonate (PC), dimethyl carbonate (DMC), ethyl methyl carbonate (EMC), butylene carbonate, gamma-butyrolactone, gamma-valerolactone, dipropyl carbonate, N-methyl pyrrolidone (NMP), N-methylformamide, N-methylacetamide, N,N-dimethylformamide, N,N-diethylformamide, diethyl ether, acetonitrile, propionitrile, anisole, succinonitrile, adiponitrile, glutaronitrile, dimethyl sulfoxide, dimethyl sulfite, vinylene carbonate, ethyl methyl carbonate, dimethyl carbonate, diethyl carbonate, fluoroethylene carbonate, chloropropylene carbonate, acetonitrile, succinonitrile, methoxymethylsulfone, tetrahydrofuran, 2-methyltetrahydrofuran, epoxy propane, methyl acetate, ethyl acetate, propyl acetate, methyl butyrate, ethyl propionate, methyl propionate, 1,3-dioxolane, 1,2-diethoxyethane, 1,2-dimethoxyethane, and 1,2-dibutoxy.

The lithium salt can comprise at least one of lithium chloride (LiCl), lithium hexafluorophosphate (LiPF$_6$), lithium tetrafluoroborate (LiBF$_4$), lithium methanesulfonate (LiCH$_3$SO$_3$), lithium trifluoromethanesulfonate (LiCF$_3$SO$_3$), lithium hexafluoroarsenate (LiAsF$_6$), lithium hexafluoroantimonate (LiSbF$_6$), lithium perchlorate (LiClO$_4$), Li[BF$_2$(C$_2$O$_4$)], Li[PF$_2$(C$_2$O$_4$)$_2$], Li[N(CF$_3$SO$_2$)$_2$], Li[C(CF$_3$SO$_2$)$_3$], lithium bisoxalatoborate (LiBOB), and lithium bis(trifluoromethanesulphonyl)imide (LiTFSI).

Example 1

In molar ratio, 0.4 parts of 2,2'-bis(4-aminophenoxyphenyl)propane (BAPP), 0.6 parts of 4,4'-oxydianiline (ODA), and m-cresol are added as the organic solvent are added in a triple-neck flask (a solid content of the solution is about 10%), stirred at room temperature to dissolve completely. 1 part of 2,3,3',4'-diphenyl ether tetracarboxylic acid dianhydride is then added and dissolved completely. The solution is heated to about 50° C. and reacted for about 4 hours followed by adding 1.5 mL of benzoic acid as the catalyst. Then the solution is heated to about 180° C. and reacted for about 24 hours. Finally, the reaction is terminated and the solution is precipitated in methanol to obtain the cathode binder, which is a fiber shaped polymer represented by formula VI.

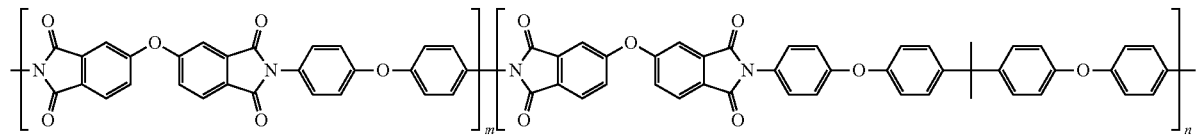

IV

Example 2

70% of sulfur-carbon cathode electrode material, 10% of the cathode binder obtained in Example 1, and 20% of the conducting graphite by mass percent are mixed and dispersed by the NMP to form a slurry. The slurry is coated on an aluminum foil and vacuum dried at about 60° C. for about 24 hours to obtain the cathode electrode. The counter electrode is lithium metal. The electrolyte liquid is 1 M of LiTFSI dissolved in a solvent mixture of DOL/DME=1/1 (v/v). The counter electrode, the cathode electrode, and the electrolyte liquid are assembled to form a 2032 coin-type battery.

Example 3

75% of sulfur-carbon cathode electrode material, 5% of the cathode binder obtained in Example 1, and 20% of the conducting graphite by mass percent are mixed and dispersed by the NMP to form a slurry. The slurry is coated on an aluminum foil and vacuum dried at about 60° C. for about 24 hours to obtain the cathode electrode. The counter electrode is lithium metal. The electrolyte liquid is 1 M of LiTFSI dissolved in a solvent mixture of DOL/DME=1/1 (v/v). The counter electrode, the cathode electrode, and the electrolyte liquid are assembled to form a 2032 coin-type battery.

Example 4

In molar ratio, 0.4 parts of 2,2'-bis(4-aminophenoxyphenyl)propane (BAPP), 0.6 parts of 4,4'-methylenedianiline, and m-cresol as the organic solvent are added in a triple-neck flask (a solid content of the solution is about 10%), stirred at room temperature to dissolve completely. 1 part of 2,3,3',4'-diphenyl ether tetracarboxylic acid dianhydride is then added and dissolved completely. The solution is heated to about 50° C. and reacted for about 4 hours followed by adding 1.5 mL of benzoic acid as the catalyst. Then the solution is heated to about 180° C. and reacted for about 24 hours. Finally, the reaction is terminated and the solution is precipitated in methanol to obtain the cathode binder, which is a fiber shaped polymer represented by formula VII.

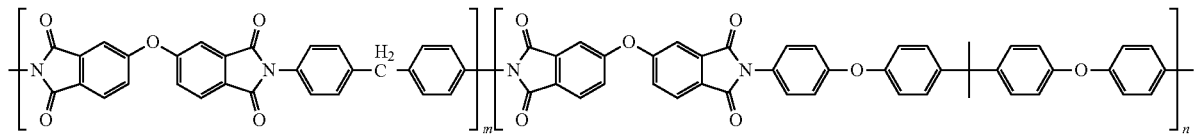

VII

Example 5

70% of sulfur-carbon cathode electrode material, 10% of the cathode binder obtained in Example 4, and 20% of the conducting graphite by mass percent are mixed and dispersed by the NMP to form a slurry. The slurry is coated on an aluminum foil and vacuum dried at about 60° C. for about 24 hours to obtain the cathode electrode. The counter electrode is lithium metal. The electrolyte liquid is 1 M of LiTFSI dissolved in a solvent mixture of DOL/DME=1/1 (v/v). The counter electrode, the cathode electrode, and the electrolyte liquid are assembled to form a 2032 coin-type battery.

Comparative Example 1

70% of sulfur-carbon cathode electrode material, 10% of PVDF as the binder, and 20% of the conducting graphite by mass percent are mixed and dispersed by the NMP to form a slurry. The slurry is coated on an aluminum foil and vacuum dried at about 120° C. for about 24 hours to obtain the cathode electrode. The counter electrode is lithium metal. The electrolyte liquid is 1 M of LiTFSI dissolved in a solvent mixture of DOL/DME=1/1 (v/v). The counter electrode, the cathode electrode, and the electrolyte liquid are assembled to form a 2032 coin-type battery.

The above-described Examples and Comparative Example adopt the same sulfur-carbon cathode electrode material formed by mixing the elemental sulfur with the conductive carbon.

Cycling Performance Test of Batteries

The test conditions are as follows: in the voltage range of 1V to 3V, the batteries are charged and discharged at a constant current rate (C-rate) of 0.1 C. Referring to the FIGURE and Table 1, the cycling performance of the lithium sulfur batteries in Example 2 and Comparative Example 1 is shown in FIG. 1. The discharge specific capacity of the first cycle, the discharge specific capacity at the $30^{th}$ cycle, and the capacity retention at the $30^{th}$ cycle of the lithium sulfur batteries in Examples 2, 3, 5, and Comparative Example 1 are shown in Table 1. It can be seen that the cycling performances of the lithium sulfur batteries using the polyimide binder is greatly improved compared with that of the lithium sulfur battery using PVDF as the binder.

TABLE 1

|  | Discharge specific capacity (mAh/g) at 1st cycle | Discharge specific capacity (mAh/g) at $30^{th}$ cycle | Capacity retention (%) at $30^{th}$ cycle |
| --- | --- | --- | --- |
| Example 2 | 1112.6 | 519.4 | 47.3% |
| Example 3 | 1034.5 | 508.8 | 49.2% |
| Example 5 | 1086.3 | 528.5 | 48.7% |

TABLE 1-continued

|  | Discharge specific capacity (mAh/g) at 1st cycle | Discharge specific capacity (mAh/g) at $30^{th}$ cycle | Capacity retention (%) at $30^{th}$ cycle |
| --- | --- | --- | --- |
| Comparative Example 1 | 1020.9 | 393.6 | 38.6% |

Binding Force Test

The binding force tests are carried out for the cathode electrodes of Examples 2, 3, 5, and Comparative Example 1, respectively. Adhesive tape having a width of 20 mm±1 mm is used. First, 3 to 5 outer layers of the adhesive tape are peeled off, and then more than 150 mm long of the adhesive tape is taken. The adhesive tape does not contact a hand or any other object. One end of the adhesive tape is adhered to the cathode electrode, and the other end of the adhesive tape is connected to a holder. A roller under its own weight is rolled on the cathode electrode at a speed of about 300 mm/min back and forth over the entire length of the cathode electrode about three times. The test is carried out after resting the cathode electrode in the test environment for about 20 minutes to about 40 minutes. The adhesive tape is peeled from the cathode electrode by a testing machine at a speed of about 300 mm/min±10 mm/min. The test results are shown in Table 2, revealing that the cathode binders of Examples 2, 3, and 5 have a stronger binding force than Comparative Example 1.

TABLE 2

| Sample | Sample Thickness/μm | Sample Width/mm | Maximum load/N |
|---|---|---|---|
| Example 2 | 58 ± 2 | 20 | 3.6 |
| Example 3 | 58 ± 2 | 20 | 3.2 |
| Example 5 | 58 ± 2 | 20 | 3.7 |
| Comparative Example 1 | 58 ± 2 | 20 | 1.6 |

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A cathode electrode material comprising a sulfur containing cathode active material, a conducting agent, and a cathode binder, wherein the cathode binder comprises a polymer obtained by polymerizing a dianhydride monomer with a diamine monomer, the dianhydride monomer is represented by formula III, the diamine monomer comprises a first monomer represented by formula IV,

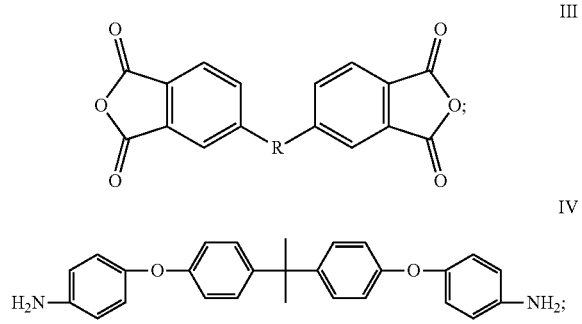

wherein the R in formula III is selected from the group consisting of bisphenol A unit, —S—, and —CH$_2$—.

2. The cathode electrode material of claim 1, wherein the dianhydride monomer is 4,4'-(4,4'-isopropylidenediphenoxy)bis(phthalic anhydride).

3. The cathode electrode material of claim 1, wherein the diamine monomer further comprises a second monomer represented by formula V,

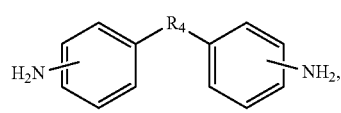

wherein the R$_4$ is a bivalent organic substituent.

4. The cathode electrode material of claim 3, wherein the R$_4$ in formula V is selected from the group consisting of —(CH$_2$)$_n$—, —O—, —S—, —CH$_2$—O—CH$_2$—, —CH(NH)—(CH$_2$)$_n$—,

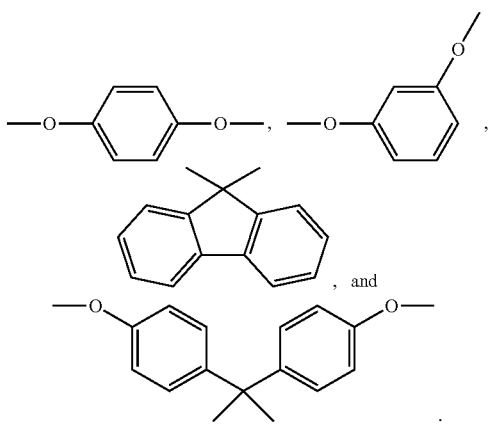

5. The cathode electrode material of claim 3, wherein a molar ratio of the first monomer to the second monomer is 1:2 to 10:1.

6. The cathode electrode material of claim 3, wherein a molar ratio of the first monomer to the second monomer is 1:1 to 3:1.

7. The cathode electrode material of claim 1, wherein a molar ratio of the dianhydride monomer to the diamine monomer is 1:10 to 10:1.

8. The cathode electrode material of claim 1, wherein a molar ratio of the dianhydride monomer to the diamine monomer is 1:2 to 4:1.

9. The cathode electrode material of claim 1, wherein a molecular weight of the polymer is in a range from about 1000 to about 50000.

10. The cathode electrode material of claim 1, wherein a mass percentage of the cathode binder is in a range from about 0.01% to about 50%.

11. The cathode electrode material of claim 1, wherein a mass percentage of the cathode binder is in a range from about 1% to about 20%.

12. The cathode electrode material of claim 1, wherein the sulfur containing cathode active material is at least one of elemental sulfur and sulfur based polymer.

13. The cathode electrode material of claim 12, wherein the sulfur based polymer is a product formed from a pyrolysis reaction, dehydrogenation and carbonation reaction, dehydration reaction, dehydrochlorination reaction, or deamination reaction of a mixture of conducting polymer and elemental sulfur.

14. The cathode electrode material of claim 12, wherein the sulfur based polymer is selected from the group consisting of sulfurized poly(pyridinopyridine), sulfurized polystyrene, sulfurized polyoxyethylene, sulfurized polyvinyl alcohol, sulfurized poly(vinylidene chloride), sulfurized poly(vinylidene difluoride), sulfurized polyvinylchloride, sulfurized polyvinyl fluoride, sulfurized poly(1,2-dichloroethylene), sulfurized poly(1,2-difluoroethylene), sulfurized polymethyl methacrylate, sulfurized phenolic resin, and combinations thereof.

15. A cathode electrode material comprising a sulfur containing cathode active material, a conducting agent, and a cathode binder, wherein the cathode binder comprises a polymer obtained by polymerizing a dianhydride monomer with a diamine monomer, the dianhydride monomer comprises a monomer selected from the group consisting of monomers represented by formulas I, II, III, and combinations thereof, the diamine monomer comprises a first monomer represented by formula IV and a second monomer represented by formula V,

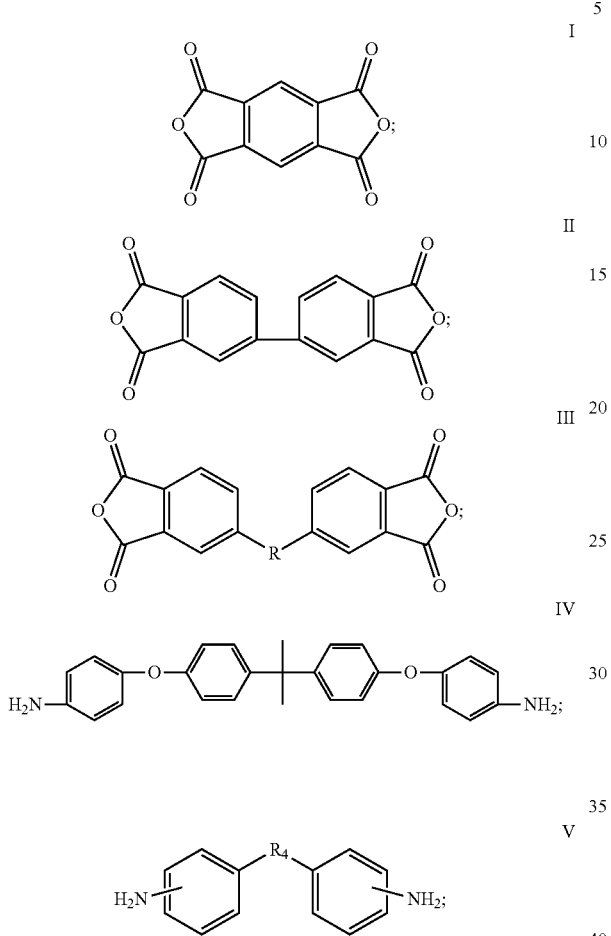

wherein the $R_4$ in formula V is selected from the group consisting of —$(CH_2)_n$—, —S—, —$CH_2$—O—$CH_2$—, —CH(NH)—$(CH_2)_n$—,

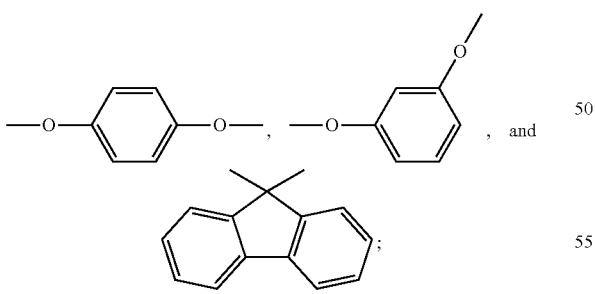

and the R in formula III is a bivalent organic substituent.

16. The cathode electrode material of claim 15, wherein the R in formula III is selected from the group consisting of bisphenol A unit, —O—, —S—, and —$CH_2$—.

17. An electrode slurry comprising a solvent, a sulfur containing cathode active material, a conducting agent, and a cathode binder mixed together,
wherein the cathode binder comprises a polymer obtained by polymerizing a dianhydride monomer with a diamine monomer at a temperature from about 160° C. to about 200° C., the dianhydride monomer comprises a monomer selected from the group consisting of monomers represented by formulas I, II, III, and combinations thereof, the diamine monomer comprises a first monomer represented by formula IV,

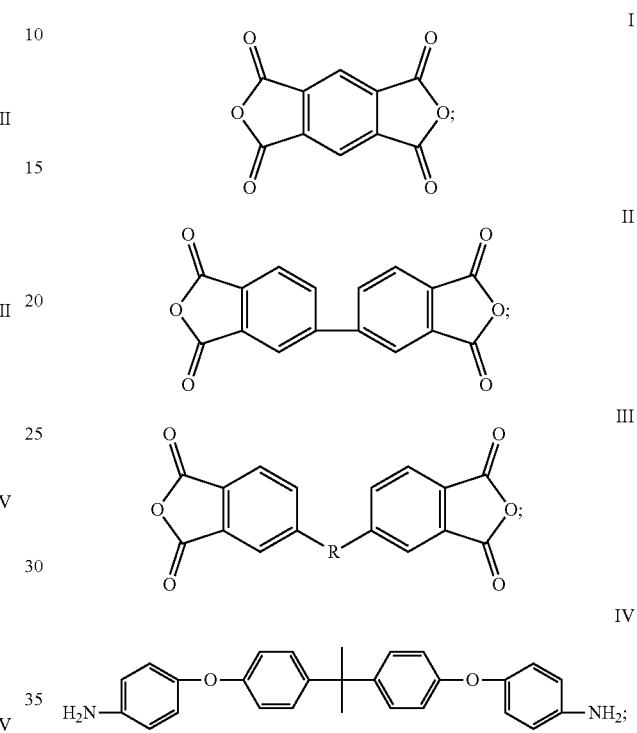

wherein the R in formula III is a bivalent organic substituent.

18. The electrode slurry of claim 17, wherein the R in formula III is selected from the group consisting of bisphenol A unit, —O—, —S—, and —$CH_2$—.

19. The electrode slurry of claim 17, wherein the diamine monomer further comprises a second monomer represented by formula V,

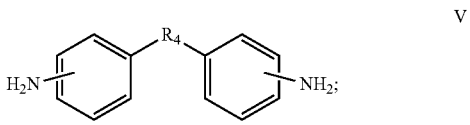

wherein the $R_4$ in formula V is selected from the group consisting of —$(CH_2)_n$—, —O—, —S—, —$CH_2$—O—$CH_2$—, —CH(NH)—$(CH_2)_n$—,

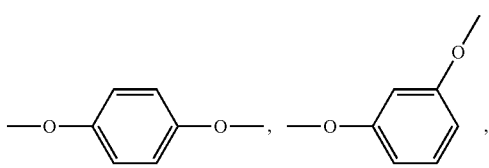

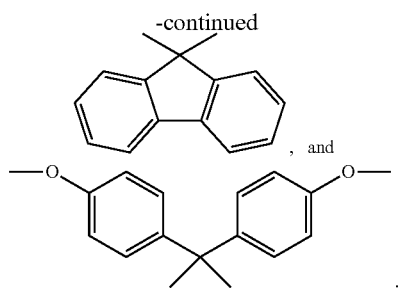
, and
* * * * *